US012613714B2

(12) United States Patent
Ghosh et al.

(10) Patent No.: US 12,613,714 B2
(45) Date of Patent: Apr. 28, 2026

(54) INTELLIGENT HIBERNATION OF MICRO FRONTENDS

(71) Applicant: Dell Products L.P., Round Rock, TX (US)

(72) Inventors: Manav Ghosh, Bangalore (IN); Rajiv Popat, Kolkata (IN)

(73) Assignee: Dell Products L.P., Round Rock, TX (US)

( * ) Notice: Subject to any disclaimer, the term of this patent is extended or adjusted under 35 U.S.C. 154(b) by 46 days.

(21) Appl. No.: 18/333,615

(22) Filed: Jun. 13, 2023

(65) Prior Publication Data

US 2024/0419460 A1     Dec. 19, 2024

(51) Int. Cl.
    *G06F 9/451*        (2018.01)
    *G06F 9/48*        (2006.01)
    *G06F 11/34*       (2006.01)

(52) U.S. Cl.
    CPC .............. *G06F 9/451* (2018.02); *G06F 9/485* (2013.01); *G06F 11/3438* (2013.01)

(58) Field of Classification Search
    CPC ....... G06F 9/451; G06F 9/485; G06F 11/3438
    See application file for complete search history.

(56) References Cited

U.S. PATENT DOCUMENTS

| | | | | |
|---|---|---|---|---|
| 7,000,102 | B2 * | 2/2006 | Kumar | G06F 1/3203 |
| | | | | 713/323 |
| 10,394,304 | B2 * | 8/2019 | Maisuria | G06F 9/4418 |
| 2011/0022984 | A1 * | 1/2011 | van der Meulen | G06F 9/44526 |
| | | | | 715/830 |
| 2013/0262898 | A1 * | 10/2013 | Preston | G06F 11/1417 |
| | | | | 713/323 |
| 2019/0138077 | A1 * | 5/2019 | Decker | G06F 1/329 |

FOREIGN PATENT DOCUMENTS

WO      WO-2013148074 A1 * 10/2013      ........ G06F 11/1417

* cited by examiner

*Primary Examiner* — Stephen S Hong
*Assistant Examiner* — Darrin Hope
(74) *Attorney, Agent, or Firm* — Daly, Crowley, Mofford & Durkee, LLP

(57) ABSTRACT

An example methodology includes, by a computing device, determining a micro frontend (MFE) on a page of an application to hibernate based on interaction metrics of the MFE and a hibernation policy and capturing a screenshot image of the MFE. The method also includes, by the computing device, saving information about a current state of the MFE in a manifest associated with the MFE and replacing the MFE on the page of the application with the screenshot image of the MFE to hibernate the MFE.

20 Claims, 9 Drawing Sheets

800

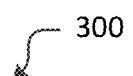
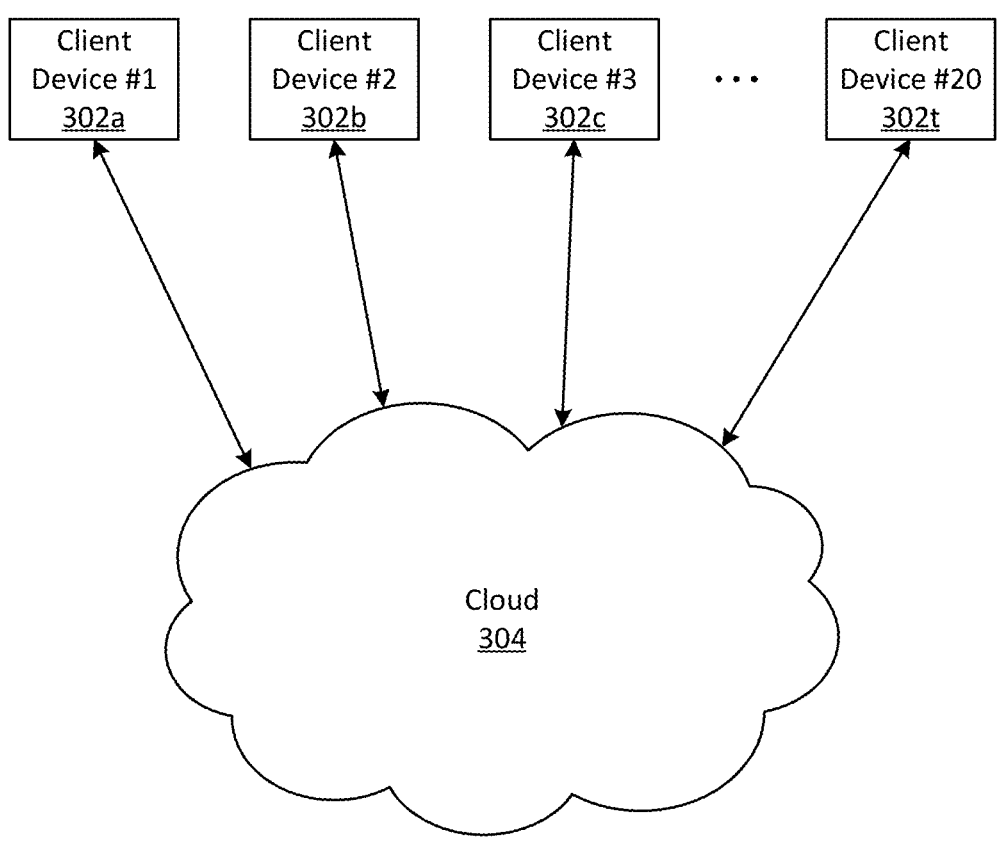
FIG. 3

700

```
{
   "Hibernation-Config": {
      "MFEs": {
         "News": {                              702a
            "Hibernate-After": "40s",
            "Take-Screenshot": "true",
            "Smart-Wake-On-Click": "true",
            "Show-Manual-Hibernate-Button": "false",
            "Hibernation-Style": "greyed"
         },
         "Weather": {                           702b
            "Hibernate-After": "10s",
            "Take-Screenshot": "true",
            "Smart-Wake-On-Click": "true",
            "Show-Manual-Hibernate-Button": "false",
            "Hibernation-Style": "greyed"
         },
         "Trivia": {                            702c
            "Hibernate-After": "40s",
            "Take-Screenshot": "true",
            "Smart-Wake-On-Click": "true",
            "Show-Manual-Hibernate-Button": "true",
            "Hibernation-Style": "greyed"
         },
         "Contact-Support": {                   702d
            "Hibernate-After": "60s",
            "Take-Screenshot": "true",
            "Smart-Wake-On-Click": "true",
            "Show-Manual-Hibernate-Button": "false",
            "Hibernation-Style": "seamless"
         }
      }
   }
}
```

INTELLIGENT HIBERNATION OF MICRO FRONTENDS

BACKGROUND

Micro frontend (MFE) architecture is an emerging architectural style that enables the development of web applications. As the name suggests, MFEs provide the same flexibility and maintainability to browser-based applications that microservices provide for backend systems. The MFE architecture is a design approach in which web application user interfaces (UIs) are put together from autonomous components, called MFEs. The MFEs can be developed, tested, and deployed independently of one another.

SUMMARY

This Summary is provided to introduce a selection of concepts in simplified form that are further described below in the Detailed Description. This Summary is not intended to identify key or essential features or combinations of the claimed subject matter, nor is it intended to be used to limit the scope of the claimed subject matter.

In accordance with one illustrative embodiment provided to illustrate the broader concepts, systems, and techniques described herein, a method includes, by a computing device, determining a micro frontend (MFE) on a page of an application to hibernate based on interaction metrics of the MFE and a hibernation policy, saving information about a current state of the MFE in a manifest associated with the MFE, and replacing the MFE on the page of the application with a screenshot image of the MFE to hibernate the MFE.

In some embodiments, the hibernation policy specifies one or more MFEs which can be hibernated and, for each MFE of the one or more MFEs, one or more conditions for hibernation. In one embodiment, the one or more conditions include an MFE non-interaction duration threshold.

In some embodiments, the MFE is determined based on a size of the MFE.

In some embodiments, the information about the current state of the MFE in the manifest includes information about a dependency of the MFE.

In some embodiments, the screenshot image of the MFE is a screenshot of the MFE from a previous hibernation of the MFE.

In some embodiments, the method also includes, responsive to activation of the hibernated MFE, by the computing device, recreating the MFE from the information about the current state of the MFE in the manifest, saving the screenshot image of the MFE on the page to local storage, and replacing the screenshot image of the MFE on the page of the application with the recreated MFE.

According to another illustrative embodiment provided to illustrate the broader concepts described herein, a device includes one or more non-transitory machine-readable mediums configured to store instructions and one or more processors configured to execute the instructions stored on the one or more non-transitory machine-readable mediums. Execution of the instructions causes the one or more processors to carry out a process including determining a micro frontend (MFE) on a page of an application to hibernate based on interaction metrics of the MFE and a hibernation policy, saving information about a current state of the MFE in a manifest associated with the MFE, and replacing the MFE on the page of the application with a screenshot image of the MFE to hibernate the MFE.

According to another illustrative embodiment provided to illustrate the broader concepts described herein, a non-transitory machine-readable medium encodes instructions that when executed by one or more processors cause a process to be carried out, the process including determining a micro frontend (MFE) on a page of an application to hibernate based on interaction metrics of the MFE and a hibernation policy, saving information about a current state of the MFE in a manifest associated with the MFE, and replacing the MFE on the page of the application with a screenshot image of the MFE to hibernate the MFE.

In accordance with another illustrative embodiment provided to illustrate the broader concepts, systems, and techniques described herein, a method includes, by a computing device, injecting a manual hibernation user interface (UI) element in a micro frontend (MFE) visible in a viewport of a page of an application and, responsive to activation of the manual hibernation UI element, capturing a screenshot image of the MFE, saving information about a current state of the MFE in a manifest associated with the MFE, and replacing the MFE on the page of the application with the screenshot image of the MFE to hibernate the MFE.

In some embodiments, the MFE is specified in a hibernation policy as an MFE that can be manually hibernated.

In some embodiments, the method also includes, responsive to activation of the hibernated MFE, by the computing device, recreating the MFE from the information about the current state of the MFE in the manifest, saving the screenshot image of the MFE on the page to local storage, and replacing the screenshot image of the MFE on the page of the application with the recreated MFE.

According to still another illustrative embodiment provided to illustrate the broader concepts described herein, a device includes one or more non-transitory machine-readable mediums configured to store instructions and one or more processors configured to execute the instructions stored on the one or more non-transitory machine-readable mediums. Execution of the instructions causes the one or more processors to carry out a process including injecting a manual hibernation user interface (UI) element in a micro frontend (MFE) visible in a viewport of a page of an application and, responsive to activation of the manual hibernation UI element, capturing a screenshot image of the MFE, saving information about a current state of the MFE in a manifest associated with the MFE, and replacing the MFE on the page of the application with the screenshot image of the MFE to hibernate the MFE.

According to a further illustrative embodiment provided to illustrate the broader concepts described herein, a non-transitory machine-readable medium encodes instructions that when executed by one or more processors cause a process to be carried out, the process including injecting a manual hibernation user interface (UI) element in a micro frontend (MFE) visible in a viewport of a page of an application and, responsive to activation of the manual hibernation UI element, capturing a screenshot image of the MFE, saving information about a current state of the MFE in a manifest associated with the MFE, and replacing the MFE on the page of the application with the screenshot image of the MFE to hibernate the MFE.

It should be appreciated that individual elements of different embodiments described herein may be combined to form other embodiments not specifically set forth above. Various elements, which are described in the context of a single embodiment, may also be provided separately or in any suitable sub-combination. It should also be appreciated that other embodiments not specifically described herein are also within the scope of the claims appended hereto.

BRIEF DESCRIPTION OF THE DRAWINGS

The foregoing and other objects, features and advantages will be apparent from the following more particular description of the embodiments, as illustrated in the accompanying drawings in which like reference characters refer to the same parts throughout the different views. The drawings are not necessarily to scale, emphasis instead being placed upon illustrating the principles of the embodiments.

FIG. 3 is a diagram of a cloud computing environment in which various aspects of the concepts described herein may be implemented.

FIG. 7 is a diagram illustrating a portion of an example hibernation policy, in accordance with an embodiment of the present disclosure.

DETAILED DESCRIPTION

Micro frontends (MFEs) are all the rage in UX design. The popular JavaScript frameworks, such as ANGULAR, React, and VUE, provide frameworks that allow developers to build tiny MFEs that, once developed, are reusable on any website or web application even if the website or web application is built using a different technology. While this is amazing from a reusability perspective, each MFE is often packaged with the underlying framework runtime (e.g., the entire ANGULAR, VUE, or React runtime) as well as additional code that needs to run on the client, which makes the MFEs rather expensive from a sustainability perspective. For example, a typical ANGULAR runtime has a size of approximately 167 Kb, and custom code inside an MFE may consume another 150 Kb. On average, a typical MFE is expected to have a size of approximately 300 Kb. Assuming a typical application composed of 15 MFEs, hibernating three of the 15 MFEs may result in a reduction of 900 Kb of JavaScript. According to data from websitecarbon.com, an average website produces approximately 1.76 grams of $CO_2$ per page view. For an average website with 100,000 views which produces approximately 2,110 Kg of $CO_2$ a year, simply hibernating 3 of the 15 MFEs may produce a reduction of 422 Kg of $CO_2$ per year.

Certain embodiments of the concepts, techniques, and structures disclosed herein are directed to intelligent hibernation of MFEs on a page of a website or web application. In some embodiments, an MFE on a page may be hibernated based on interaction metrics of the MFE and a hibernation policy. In some embodiments, an MFE on a page may be hibernated in response to activation of a manual hibernation user interface (UI) element (e.g., a manual hibernation button) provided with the MFE. Numerous variations and configurations will be apparent in light of this disclosure.

Figure 1:
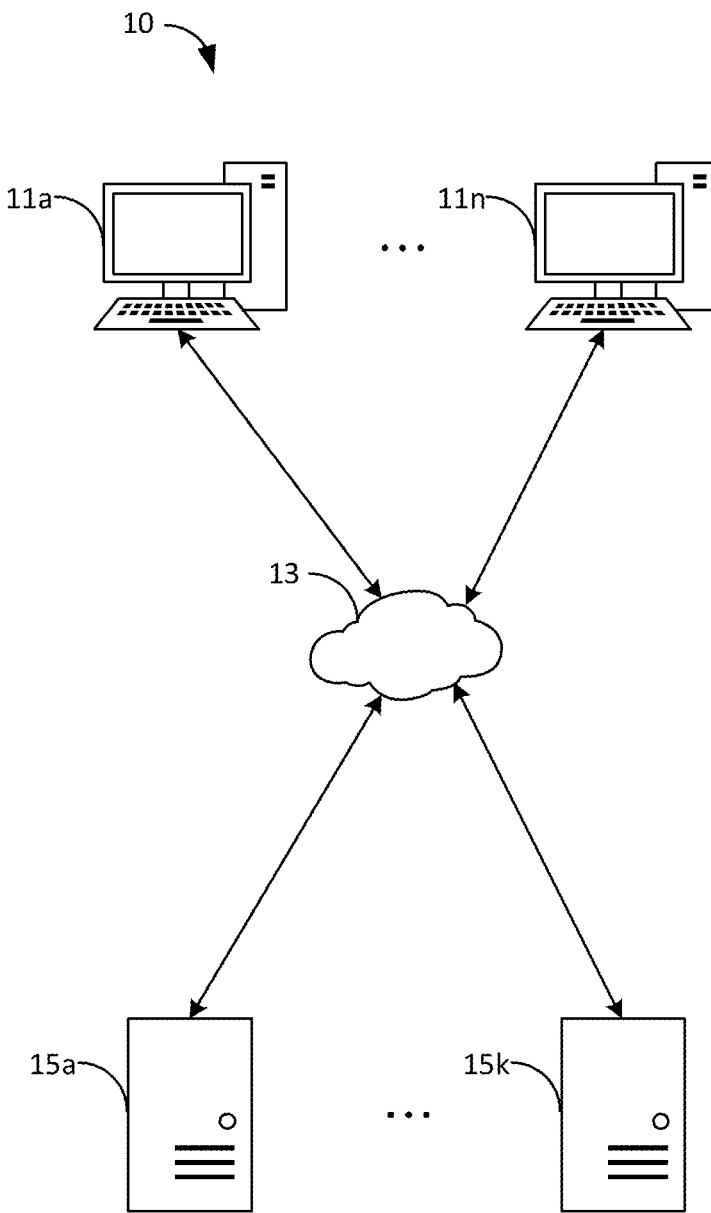
FIG. 1 is a diagram illustrating an example network environment of computing devices in which various aspects of the disclosure may be implemented, in accordance with an embodiment of the present disclosure.

Referring now to FIG. 1, shown is a diagram illustrating an example network environment 10 of computing devices in which various aspects of the disclosure may be implemented, in accordance with an embodiment of the present disclosure. As shown, environment 10 includes one or more client machines 11a-11n (11 generally), one or more server machines 15a-15k (15 generally), and one or more networks 13. Client machines 11 can communicate with server machines 15 via networks 13. Generally, in accordance with client-server principles, a client machine 11 requests, via network 13, that a server machine 15 perform a computation or other function, and server machine 15 responsively fulfills the request, optionally returning a result or status indicator in a response to client machine 11 via network 13.

In some embodiments, client machines 11 can communicate with remote machines 15 via one or more intermediary appliances (not shown). The intermediary appliances may be positioned within network 13 or between networks 13. An intermediary appliance may be referred to as a network interface or gateway. In some implementations, the intermediary appliance may operate as an application delivery controller (ADC) in a datacenter to provide client machines (e.g., client machines 11) with access to business applications and other data deployed in the datacenter. The intermediary appliance may provide client machines with access to applications and other data deployed in a cloud computing environment, or delivered as Software as a Service (SaaS) across a range of client devices, and/or provide other functionality such as load balancing, etc.

Client machines 11 may be generally referred to as computing devices 11, client devices 11, client computers 11, clients 11, client nodes 11, endpoints 11, or endpoint nodes 11. Client machines 11 can include, for example, desktop computing devices, laptop computing devices, tablet computing devices, mobile computing devices, workstations, and/or hand-held computing devices. Server machines 15 may also be generally referred to as a server farm 15. In some embodiments, a client machine 11 may have the capacity to function as both a client seeking access to resources provided by server machine 15 and as a server machine 15 providing access to hosted resources for other client machines 11.

Server machine 15 may be any server type such as, for example, a file server, an application server, a web server, a proxy server, a virtualization server, a deployment server, a Secure Sockets Layer Virtual Private Network (SSL VPN) server; an active directory server; a cloud server; or a server executing an application acceleration program that provides firewall functionality, application functionality, or load balancing functionality. Server machine 15 may execute, operate, or otherwise provide one or more applications. Non-limiting examples of applications that can be provided include software, a program, executable instructions, a virtual machine, a hypervisor, a web browser, a web-based client, a client-server application, a thin-client, a streaming application, a communication application, or any other set of executable instructions.

In some embodiments, server machine 15 may execute a virtual machine providing, to a user of client machine 11, access to a computing environment. In such embodiments, client machine 11 may be a virtual machine. The virtual machine may be managed by, for example, a hypervisor, a virtual machine manager (VMM), or any other hardware virtualization technique implemented within server machine 15.

Networks 13 may be configured in any combination of wired and wireless networks. Network 13 can be one or more of a local-area network (LAN), a wide area network (WAN), a metropolitan area network (MAN), a virtual private network (VPN), a primary public network, a primary private network, the Internet, or any other type of data network. In some embodiments, at least a portion of the functionality associated with network 13 can be provided by a cellular data network and/or mobile communication network to facilitate communication among mobile devices. For short range communications within a wireless local-area network (WLAN), the protocols may include 802.11, Bluetooth, and Near Field Communication (NFC).

Figure 2:
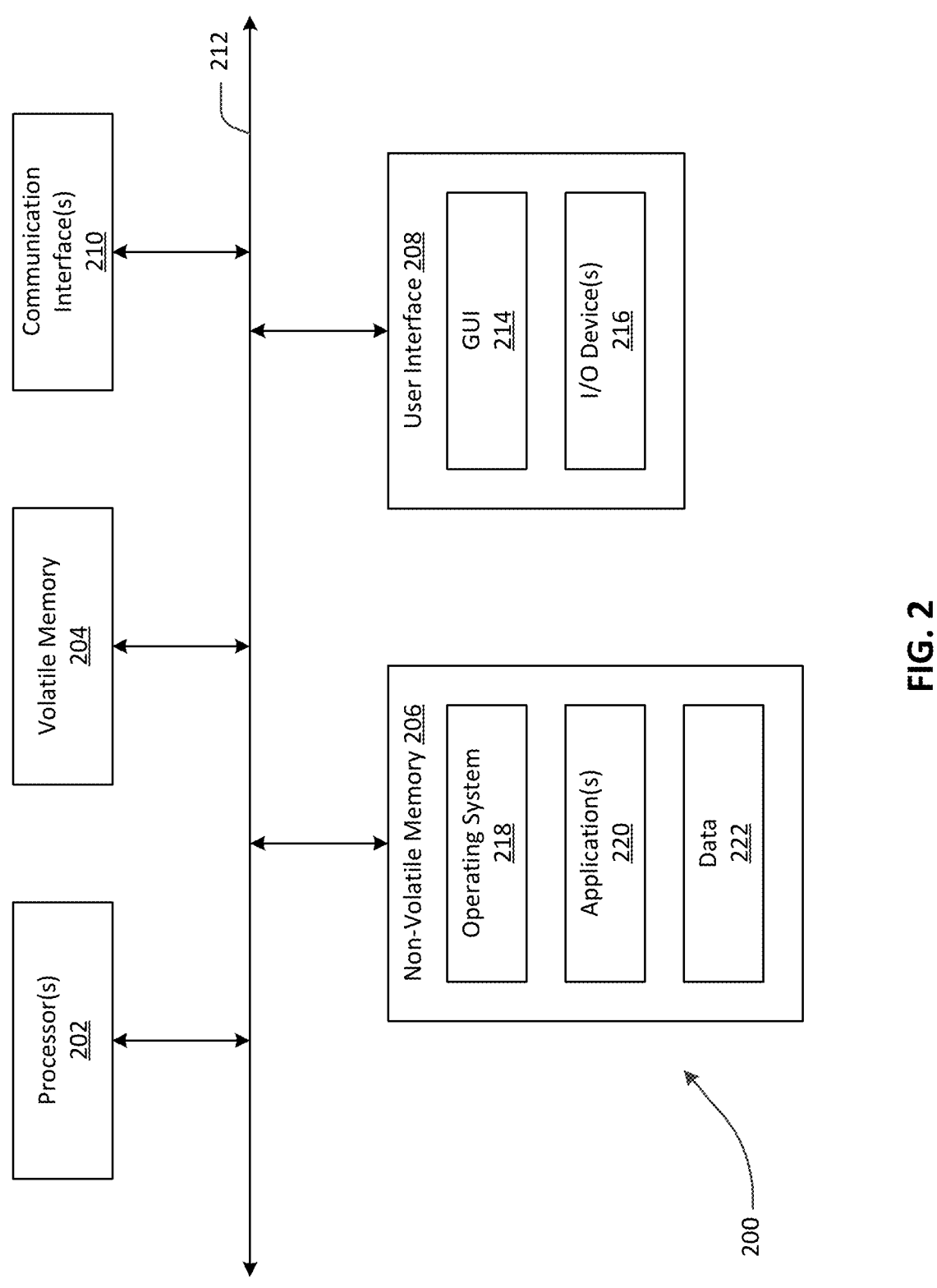
FIG. 2 is a block diagram illustrating selective components of an example computing device in which various aspects of the disclosure may be implemented, in accordance with an embodiment of the present disclosure.

FIG. 2 is a block diagram illustrating selective components of an example computing device 200 in which various aspects of the disclosure may be implemented, in accordance with an embodiment of the present disclosure. For instance, client machines 11 and/or server machines 15 of FIG. 1 can be substantially similar to computing device 200. As shown, computing device 200 includes one or more processors 202, a volatile memory 204 (e.g., random access memory (RAM)), a non-volatile memory 206, a user interface (UI) 208, one or more communications interfaces 210, and a communications bus 212.

Non-volatile memory 206 may include: one or more hard disk drives (HDDs) or other magnetic or optical storage media; one or more solid state drives (SSDs), such as a flash drive or other solid-state storage media; one or more hybrid magnetic and solid-state drives; and/or one or more virtual storage volumes, such as a cloud storage, or a combination of such physical storage volumes and virtual storage volumes or arrays thereof.

User interface 208 may include a graphical user interface (GUI) 214 (e.g., a touchscreen, a display, etc.) and one or more input/output (I/O) devices 216 (e.g., a mouse, a keyboard, a microphone, one or more speakers, one or more cameras, one or more biometric scanners, one or more environmental sensors, and one or more accelerometers, etc.).

Non-volatile memory 206 stores an operating system 218, one or more applications 220, and data 222 such that, for example, computer instructions of operating system 218 and/or applications 220 are executed by processor(s) 202 out of volatile memory 204. In one example, computer instructions of operating system 218 and/or applications 220 are executed by processor(s) 202 out of volatile memory 204 to perform all or part of the processes described herein (e.g., processes illustrated and described with reference to FIGS. 4 through 9). In some embodiments, volatile memory 204 may include one or more types of RAM and/or a cache memory that may offer a faster response time than a main memory. Data may be entered using an input device of GUI 214 or received from I/O device(s) 216. Various elements of computing device 200 may communicate via communications bus 212.

The illustrated computing device 200 is shown merely as an illustrative client device or server and may be implemented by any computing or processing environment with any type of machine or set of machines that may have suitable hardware and/or software capable of operating as described herein.

Processor(s) 202 may be implemented by one or more programmable processors to execute one or more executable instructions, such as a computer program, to perform the functions of the system. As used herein, the term "processor" describes circuitry that performs a function, an operation, or a sequence of operations. The function, operation, or sequence of operations may be hard coded into the circuitry or soft coded by way of instructions held in a memory device and executed by the circuitry. A processor may perform the function, operation, or sequence of operations using digital values and/or using analog signals.

In some embodiments, the processor can be embodied in one or more application specific integrated circuits (ASICs), microprocessors, digital signal processors (DSPs), graphics processing units (GPUs), microcontrollers, field programmable gate arrays (FPGAs), programmable logic arrays (PLAs), multi-core processors, or general-purpose computers with associated memory.

Processor 202 may be analog, digital, or mixed signal. In some embodiments, processor 202 may be one or more physical processors, or one or more virtual (e.g., remotely located or cloud computing environment) processors. A processor including multiple processor cores and/or multiple processors may provide functionality for parallel, simultaneous execution of instructions or for parallel, simultaneous execution of one instruction on more than one piece of data.

Communications interfaces 210 may include one or more interfaces to enable computing device 200 to access a computer network such as a Local Area Network (LAN), a Wide Area Network (WAN), a Personal Area Network (PAN), or the Internet through a variety of wired and/or wireless connections, including cellular connections.

In described embodiments, computing device 200 may execute an application on behalf of a user of a client device. For example, computing device 200 may execute one or more virtual machines managed by a hypervisor. Each virtual machine may provide an execution session within which applications execute on behalf of a user or a client device, such as a hosted desktop session. Computing device 200 may also execute a terminal services session to provide a hosted desktop environment. Computing device 200 may provide access to a remote computing environment including one or more applications, one or more desktop applications, and one or more desktop sessions in which one or more applications may execute.

Referring to FIG. 3, shown is a diagram of a cloud computing environment 300 in which various aspects of the concepts described herein may be implemented. Cloud computing environment 300, which may also be referred to as a cloud environment, cloud computing, or cloud network, can provide the delivery of shared computing resources and/or services to one or more users or tenants. For example, the shared resources and services can include, but are not limited to, networks, network bandwidth, servers, processing, memory, storage, applications, virtual machines, databases, software, hardware, analytics, and intelligence.

In cloud computing environment 300, one or more client devices 302a-302t (such as client machines 11 and/or computing device 200 described above) may be in communication with a cloud network 304 (sometimes referred to herein more simply as a cloud 304). Cloud 304 may include back-end platforms such as, for example, servers, storage, server farms, or data centers. The users of clients 302a-302t can correspond to a single organization/tenant or multiple organizations/tenants. More particularly, in one implementation, cloud computing environment 300 may provide a private cloud serving a single organization (e.g., enterprise cloud). In other implementations, cloud computing environment 300 may provide a community or public cloud serving one or more organizations/tenants.

In some embodiments, one or more gateway appliances and/or services may be utilized to provide access to cloud computing resources and virtual sessions. For example, a gateway, implemented in hardware and/or software, may be deployed (e.g., reside) on-premises or on public clouds to provide users with secure access and single sign-on to virtual, SaaS, and web applications. As another example, a secure gateway may be deployed to protect users from web threats.

In some embodiments, cloud computing environment 300 may provide a hybrid cloud that is a combination of a public cloud and a private cloud. Public clouds may include public servers that are maintained by third parties to client devices 302*a*-302*t* or the enterprise/tenant. The servers may be located off-site in remote geographical locations or otherwise.

Cloud computing environment 300 can provide resource pooling to serve clients devices 302*a*-302*t* (e.g., users of client devices 302*a*-302*n*) through a multi-tenant environment or multi-tenant model with different physical and virtual resources dynamically assigned and reassigned responsive to different demands within the respective environment. The multi-tenant environment can include a system or architecture that can provide a single instance of software, an application, or a software application to serve multiple users. In some embodiments, cloud computing environment 300 can include or provide monitoring services to monitor, control, and/or generate reports corresponding to the provided shared resources and/or services.

In some embodiments, cloud computing environment 300 may provide cloud-based delivery of various types of cloud computing services, such as Software as a service (SaaS), Platform as a Service (PaaS), Infrastructure as a Service (IaaS), and/or Desktop as a Service (DaaS), for example. IaaS may refer to a user renting the use of infrastructure resources that are needed during a specified period. IaaS providers may offer storage, networking, servers, or virtualization resources from large pools, allowing the users to quickly scale up by accessing more resources as needed. PaaS providers may offer functionality provided by IaaS, including, e.g., storage, networking, servers, or virtualization, as well as additional resources such as, for example, operating systems, middleware, and/or runtime resources. SaaS providers may offer the resources that PaaS provides, including storage, networking, servers, virtualization, operating systems, middleware, or runtime resources. SaaS providers may also offer additional resources such as, for example, data and application resources. DaaS (also known as hosted desktop services) is a form of virtual desktop service in which virtual desktop sessions are typically delivered as a cloud service along with the applications used on the virtual desktop.

Figure 4:
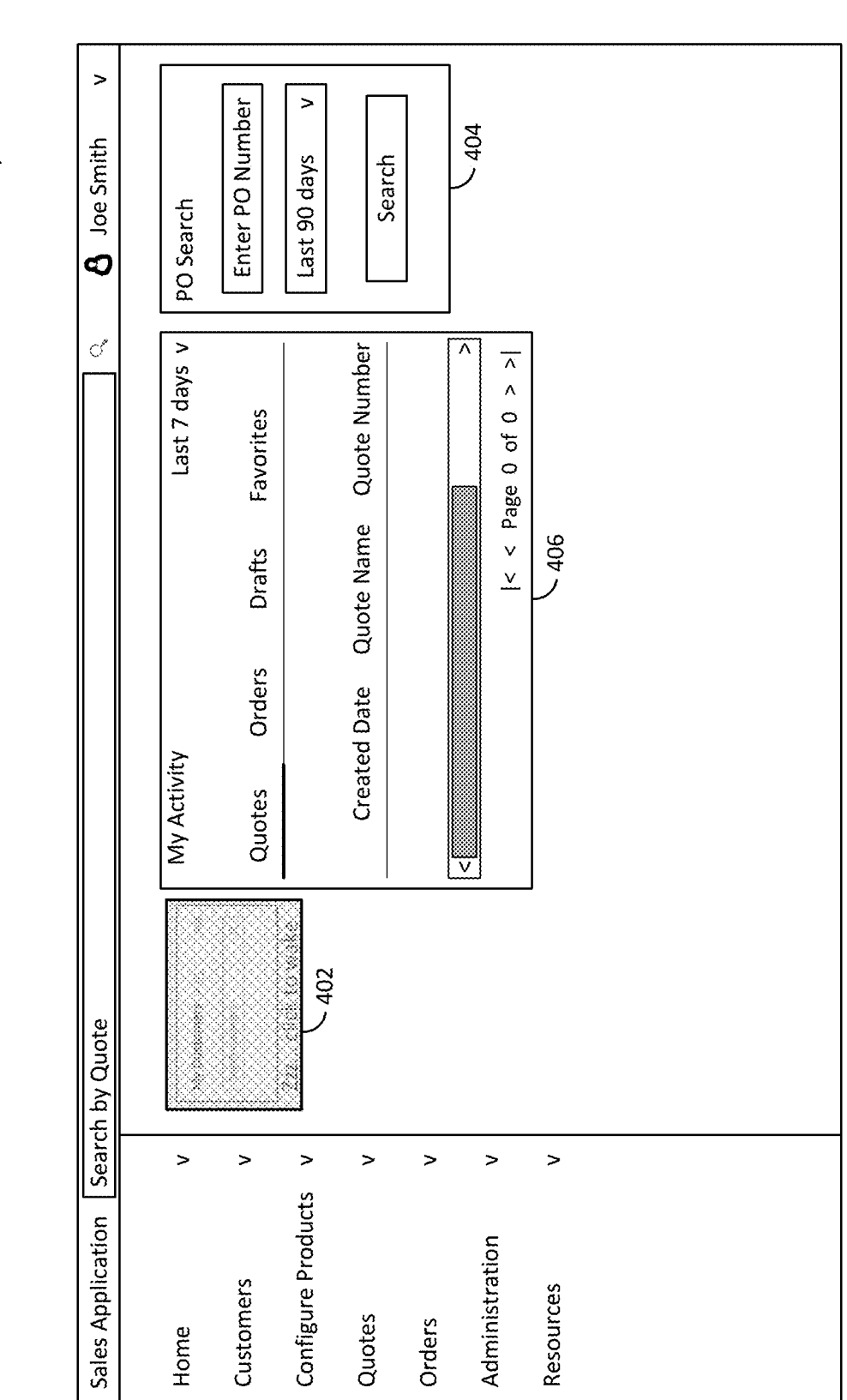
FIG. 4 is a diagram of an illustrative application window including hibernated micro frontends (MFEs), in accordance with an embodiment of the present disclosure.

FIG. 4 is a diagram of an illustrative application window 400 including hibernated micro frontends (MFEs), in accordance with an embodiment of the present disclosure. For example, illustrative application window 400 may correspond to a page of a web application that is displayed by a browser application on a client (e.g., client machine 11 of FIG. 1). As shown, application window 400 includes MFEs 402, 404, 406. In the example of FIG. 4, MFEs 402, 404 may correspond to MFSs which have been hibernated, and MFE 406 may correspond to an MFE which has not been hibernated.

In some embodiments, an MFE may be hibernated based on one or more interaction metrics and a hibernation policy. In one such embodiment, the hibernation policy may be provided with the page of the application by a server (e.g., web server). The hibernation policy may specify the MFEs which can be hibernated as well as the conditions under which the MFEs can be hibernated. By way of an example, for a particular MFE that can be hibernated, the hibernation policy may specify a non-interaction duration threshold for hibernating the MFE. For example, if a non-interaction duration threshold of 60 seconds is specified for an MFE, the MFE may be hibernated upon determining that the MFE has not been interacted with for 60 at least seconds (e.g., a user has not clicked/tapped on, hovered over, or otherwise selected the MFE within the past at least 60 seconds). Further description of the hibernation policy if provided below at least with respect to FIG. 7.

In the example of FIG. 4, MFEs 402, 404 are hibernated (i.e., each in a hibernated state) since MFEs 402, 404 satisfied the conditions specified for their hibernation in the hibernation policy. MFE 406 is not hibernated (i.e., is in a non-hibernated or "normal" state) since MFE 406 does not satisfy the conditions specified for its hibernation in the hibernation policy. For example, an MFE (e.g., MFE 402, 404) may be hibernated by placing the MFE in a state in which the MFE does not consume computing resources in the client such as, for example, central processor (CPU), memory, and network. In particular, according to one embodiment, an MFE may be hibernated by removing the code that represents the MFE from the page and saving the code and state information (e.g., information about the current state of the MFE at time of hibernation) to local storage (e.g., saving to memory on the client). The code representing the MFE on the page may be replaced with a screenshot image of the MFE to cause the image of the MFE to be displayed in place of the MFE on the page. For instance, in the example of the web application in FIG. 4, MFE 402 can be removed from the Document Object Model (DOM) structure of the page and replaced with a screenshot image of MFE 402. MFE 402 removed from the DOM and information about the current state of MFE 402 can then be saved to local storage, where they can subsequently be retrieved and used to, for example, exit (or "wake up") MFE 402 from hibernation (e.g., to restore MFE 402 to normal non-hibernated state). Similarly, MFE 404 can be removed from the DOM structure of the page and replaced with a screenshot image of MFE 404. MFE 404 removed from the DOM and information about the current state of MFE 404 can then be saved to local storage, where they can subsequently be retrieved and used to, for example, exit MFE 404 from hibernation. In the hibernated state, MFE 402, 404 are not listening to any events and not performing anything dynamic or timer based (e.g., not accessing CPU, memory, network, etc.).

In some embodiments, the screenshot image of a hibernated MFE may be displayed to show the MFE as it would appear in its normal non-hibernated state. For example, the screenshot image of MFE 404 shown on application window 400 shows MFE 404 as MFE 404 would appear in its normal non-hibernated state. In some embodiments, the screenshot image of MFE 404 may be an image of MFE 404 in its last state prior to being hibernated. In some embodiments, the screenshot image of MFE 404 may be a low-resolution image of MFE 404. In some embodiments, an overlay window may be displayed over the screenshot image of a hibernated MFE. For example, an overlay window may be displayed over the screenshot image of MFE 402 as indicated by the grey cross hatch as shown in FIG. 4. The overlay window may provide a visual cue that MFE 402 is in a hibernated state.

In some embodiments, dependencies of an MFE that is to be hibernated may be determined and hibernated along with the MFE. Dependencies of an MFE refer to the elements in the web application, such as, for example, tools, plugins, libraries, and runtimes, that are connected to execution of the MFE (e.g., the dependencies needed to run the MFE). As an example, for an Angular MFE that leverages two-way binding, the angular runtime may be one dependency and a library which allows two-way binding, such as, for example, zone.js, may be another dependency. In particular, for a particular dependency of an MFE that is to be hibernated, a check may be performed to determine whether the dependency is relied upon by another MFE or section on the page of the web application. That is, a check may be performed to determine whether another MFE or section on the page also relies or depends on the dependency of the MFE to run. If no MFE or section on the page depends on the dependency of the MFE, the dependency may also be hibernated with the MFE. For example, suppose a runtime A is a dependency of MFE 402. If runtime A is not relied upon by another MFE or section on the page, runtime A may also be hibernated with MFE 402. For example, according to one embodiment, the dependency may be hibernated by removing the code that represents the dependency (e.g., code that represents runtime A) from the page. The hibernated dependency (e.g., code representing runtime A) may be saved to local storage, where it can subsequently be retrieved and used to, for example, exit MFE 402 from hibernation.

Figure 5:
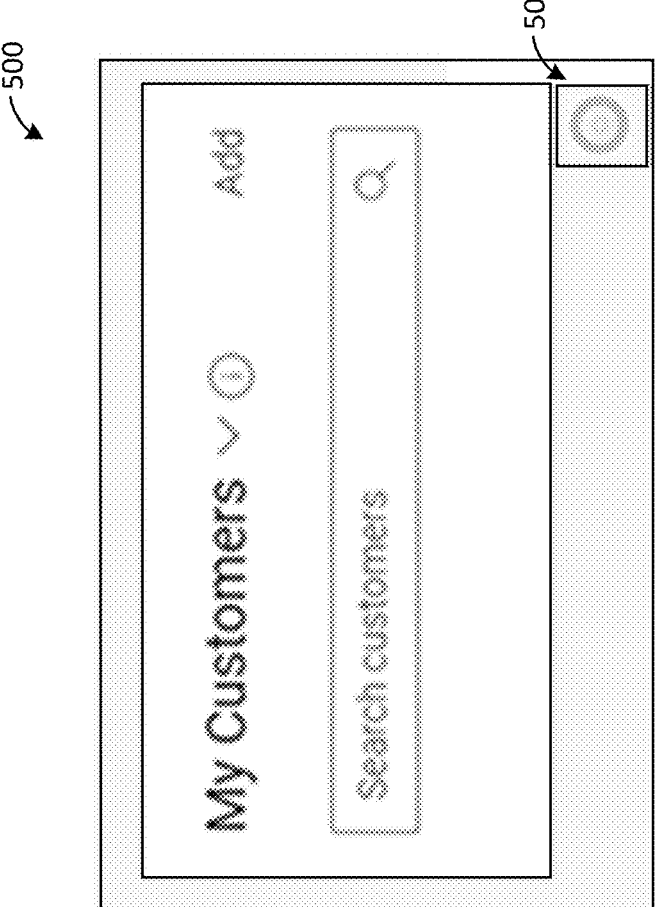
FIG. 5 is a diagram of an example micro frontend (MFE) including a manual hibernation user interface (UI) element, in accordance with an embodiment of the present disclosure.

Referring now to FIG. 5 and with continued reference to FIG. 4, shown is a diagram of an example micro frontend (MFE) 500 including a manual hibernation UI element 502, in accordance with an embodiment of the present disclosure. MFE 500 may correspond to MFE 402 of FIG. 4. UI element 502 may be a UI control for manually hibernating MFE 500. For example, according to one embodiment, the hibernation policy may specify whether an MFE can be manually hibernated. In cases where the hibernation policy specifies that an MFE can be manually hibernated, UI element 502 may be injected into the MFE. For instance, in the example of the web application, the code representing UI element 502 can be injected into the DOM of MFE 500. Manual hibernation of MFE 500 may then be triggered by activating UI element 502. For example, hibernation of MFE 500 may be triggered in response to a user clicking/tapping on UI element 502.

Figure 6:
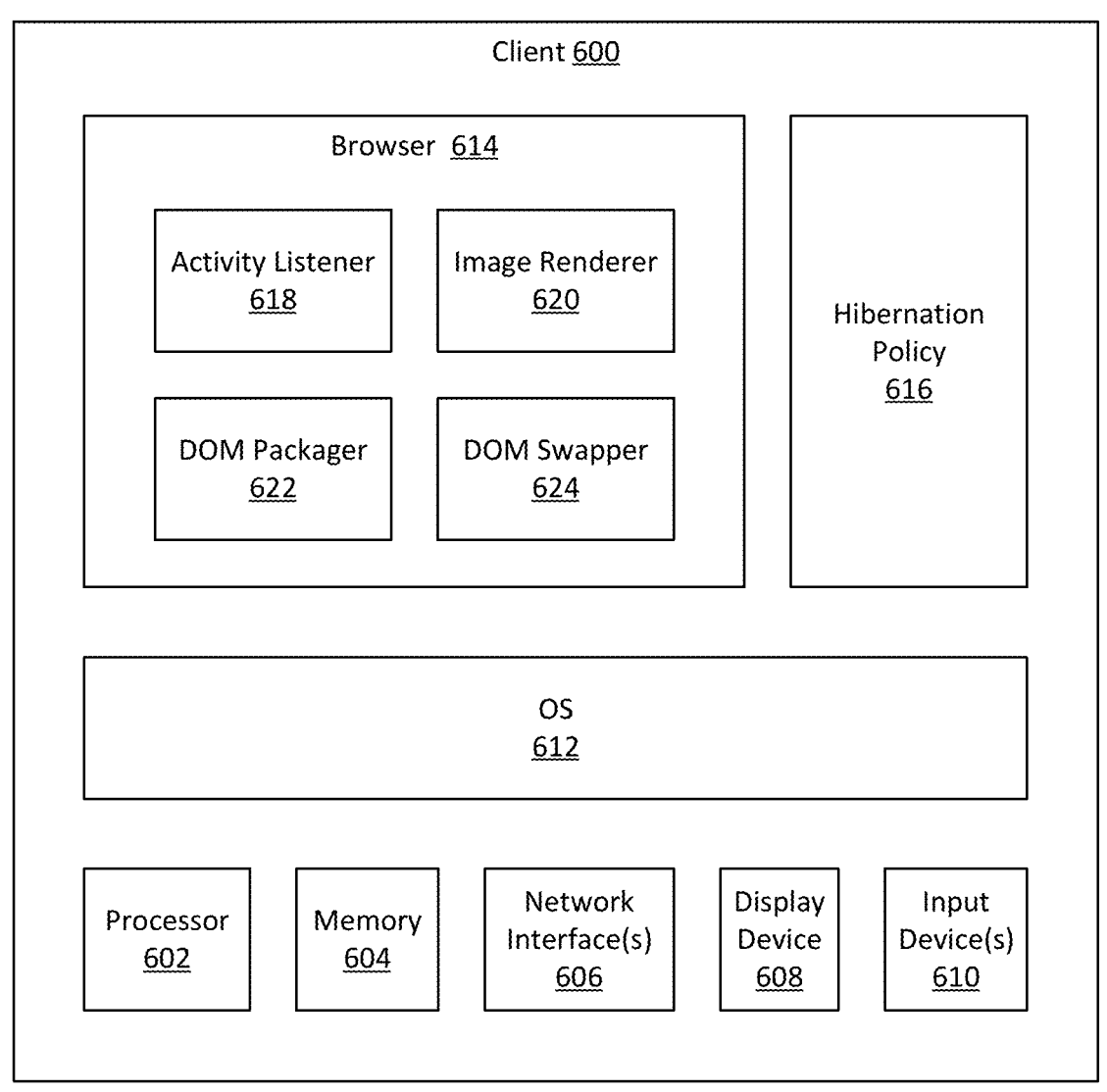
FIG. 6 is a block diagram of an illustrative client that can be used to hibernate micro frontends (MFEs), in accordance with an embodiment of the present disclosure.

FIG. 6 is a block diagram of an illustrative client 600 that can be used to hibernate micro frontends (MFEs), in accordance with an embodiment of the present disclosure. For example, client 600 may correspond to client 11 of FIG. 1. Illustrative client 600 can include a processor 602, a memory 604, one or more network interfaces 606, a display device 608, one or more input devices 610, and an operating system (OS) 612. Memory 604 can store executable instructions for OS 612 and one or more applications, and processor 602 can be configured to execute/run OS 612 and applications using the stored executable instructions. Display device 608 may be provided, for example, as a monitor or a touchscreen device. Input devices 610 may include, for example, a mouse, a keyboard, a touchpad, a touchscreen, or a stylus, to provide a few examples. OS 612 may comprise any suitable operating system, such as UNIX, LINUX, WINDOWS, GOOGLE ANDROID, MACOS, and CHROME OS.

Client 600 can further include a browser 614 and a hibernation policy 616. Browser 614 is operable to provide access to content, such as websites, web pages, web applications, and other content provided by web servers. For example, browser 614 may correspond to a CHROMIUM-based browser. As shown, browser 614 can include an activity listener 618, an image renderer 620, a DOM packager 622, and a DOM swapper 624. In some embodiments, one or more of activity listener 618, image renderer 620, DOM packager 622, and DOM swapper 624 can be provided as one or more browser extensions or browser plugins.

Activity listener 618 is operable to monitor activity within browser 614 and provide MFE hibernation orchestration utilizing the services and functionality of image renderer 620, DOM packager 622, and DOM swapper 624.

Activity listener 618 can monitor activity within browser 614 as a user visits and interacts with various websites and/or web applications. For example, activity listener 618 can monitor a current page of a website or web application that is being accessed and determine the MFEs that are on the page. For example, activity listener 618 may determine the MFEs that are on the page from the custom elements that define the MFEs within the DOM. The DOM is an interface that treats an XML or HTML document (e.g., a page) as a tree structure wherein individual nodes are objects representing a part of the document. For a given page, the DOM may include nodes corresponding to the browser window, the page, MFEs on the page, sections of the page, elements, controls, etc.

In some embodiments, activity listener 618 can use an API provided by browser 614 to listen for events on MFEs on the page. For example, activity listener 618 can listen for events on the MFEs to determine whether an MFE is outside the viewport (e.g., determine whether an MFE is outside the visible area of the page). As another example, activity listener 618 can listen for events on the MFEs to detect activation of a manual hibernation control (e.g., manual hibernation UI element 502 of FIG. 5) provided with an MFE. As still another example, activity listener 618 can listen for events on the MFEs to determine interaction metrics of the MFEs (e.g., listen for click or touch events on the MFEs to determine if the MFEs are being interacted with).

Based on the monitoring, activity listener 618 can determine the MFEs on the page that are to be hibernated (e.g., determine the MFEs that are hibernation targets). In some embodiments, activity listener 618 can make this determination based on the interaction metrics of the MFEs and hibernation policy 616. For example, via hibernation policy 616, the provider of a website or web application can define policies related to hibernation of pages and sections of pages of the web site or web application. Hibernation policy 616 may be provided to client 600 with the website or web application when the user accesses the website or web application. Hibernation policy 616 can specify the MFEs which can be hibernated and the conditions under which the MFEs can be hibernated.

An illustrative hibernation policy 700 is shown in FIG. 7. Illustrative hibernation policy 700 specifies one or more MFEs, wherein information provided for each MFE specifies the conditions under with the MFE can be hibernated as well as how the MFE is to be hibernated. In the example shown, information provided for each MFE can include the following attributes: a non-interaction duration threshold or condition for hibernating the MFE ("Hibernate-After"), whether to take a screenshot of the MFE wen hibernating the MFE ("Take-Screenshot"), whether the MFE, when in a hibernated state, is to exit the hibernated state upon being interacted with ("Smart-Wake-On-Click"), whether to display a manual hibernation UI element for the MFE ("Show-Manual-Hibernation-Button"), and how a screenshot image of the MFE is to appear when the MFE is in a hibernated state ("Hibernation-Style").

In the example of FIG. 7, hibernation policy 700 specifies four MFEs 702a-702d. MFE 702a indicates that an MFE with the title "News" can be hibernated after at least 40 seconds of non-interaction ("Hibernate-After": "40 s"), that a screenshot image of the MFE with the title "News" is to be taken when hibernating the MFE ("Take-Screenshot": "true"), that the MFE with the title "News" is to exit the hibernated state upon being interacted with ("Smart-Wake-On-Click": "true"), that a manual hibernation UI element is not to be displayed for the MFE with the title "News" ("Show-Manual-Hibernation-Button": "false"), and that the screenshot image of the MFE with the title "News" is to appear greyed (e.g., display an overlay window over the MFE with the title "News") when the MFE is in the hibernated state ("Hibernation-Style": "greyed"). MFE 702b indicates that an MFE with the title "Weather" can be hibernated after at least 10 seconds of non-interaction ("Hibernate-After": "10 s"), that a screenshot image of the MFE with the title "Weather" is to be taken when hibernating the MFE ("Take-Screenshot": "true"), that the MFE with the title "Weather" is to exit the hibernated state upon being interacted with ("Smart-Wake-On-Click": "true"), that a manual hibernation UI element is not to be displayed for the MFE with the title "Weather" ("Show-Manual-Hibernation-Button": "false"), and that the screenshot image of the MFE with the title "Weather" is to appear greyed when the MFE is in the hibernated state ("Hibernation-Style": "greyed").

Still referring to the example of FIG. 7, MFE 702c indicates that an MFE with the title "Trivia" can be hibernated after at least 40 seconds of non-interaction ("Hibernate-After": "40 s"), that a screenshot image of the MFE with the title "Trivia" is to be taken when hibernating the MFE ("Take-Screenshot": "true"), that the MFE with the title "Trivia" is to exit the hibernated state upon being interacted with ("Smart-Wake-On-Click": "true"), that a manual hibernation UI element is to be displayed for the MFE with the title "Trivia" ("Show-Manual-Hibernation-Button": "true"), and that the screenshot image of the MFE with the title "Trivia" is to appear greyed when the MFE is in the hibernated state ("Hibernation-Style": "greyed"). MFE 702d indicates that an MFE with the title "Contact-Support" can be hibernated after at least 60 seconds of non-interaction ("Hibernate-After": "60 s"), that a screenshot image of the MFE with the title "Contact-Support" is to be taken when hibernating the MFE ("Take-Screenshot": "true"), that the MFE with the title "Contact-Support" is to exit the hibernated state upon being interacted with ("Smart-Wake-On-Click": "true"), that a manual hibernation UI element is not to be displayed for the MFE with the title "Contact-Support" ("Show-Manual-Hibernation-Button": "false"), and that the screenshot image of the MFE with the title "Contact-Support" is to appear in its normal non-hibernated state (e.g., as the MFE with the title "Contact-Support" would appear when in the non-hibernated state) when the MFE is in the hibernated state ("Hibernation-Style": "seamless"). The number and list of MFEs shown in hibernation policy 700 is merely illustrative and may vary depending on the website or web application and/or the provider of the website or web application.

Referring again to FIG. 6, as mentioned previously, activity listener 618 can determine the MFEs on the page that are to be hibernated based on the interaction metrics of the MFEs and hibernation policy 616. For example, suppose activity listener 618 determines from the monitoring that an MFE with the title "ABC" has not been interacted with for the past 50 seconds. In this example, if hibernation policy 616 specifies that the MFE with the title "ABC" can be hibernated after at least 40 seconds of non-interaction, activity listener 618 can determine that the MFE with the title "ABC" can be hibernated (e.g., determine that the MFE with the title "ABC" is a hibernation target). As another example, suppose activity listener 618 determines from the monitoring that an MFE with the title "XYZ" is outside the viewport. In this example, if hibernation policy 616 does not specify the MFE with the title "XYZ" as an MFE that can be hibernated, activity listener 618 can determine that the MFE with the title "XYZ" is not to be hibernated even though the MFE with the title "XYZ" is outside the viewport (e.g., the MFE with the title "XYZ" is not visible in the viewport). Conversely, in this example, if hibernation policy 616 specifies that the MFE with the title "XYZ" can be hibernated, activity listener 618 can determine that the MFE with the title "XYZ" can be hibernated (e.g., determine that the MFE with the title "XYZ" is a hibernation target). In some embodiments, activity listener 618 can determine that an MFE that is outside the viewport for at least M seconds can be hibernated (where M may be a configurable parameter and specified as part of the hibernation policy).

Activity listener 618 can determine the MFEs on the page that are to be hibernated based on detection of activation of manual hibernation controls provided with the MFEs. For example, suppose a manual hibernation control is provided with an MFE. In this example, if activity listener 618 detects activation of the manual hibernation control (e.g., the user clicks/taps on the manual hibernation control), activity listener 618 can determine that the MFE whose manual hibernation control has been activated can be hibernated.

In some embodiments, activity listener 618 can determine the MFEs that are to be hibernated based on the size of the individual MFE. It is appreciated that hibernating an MFE may be more expensive in terms of computing resources than leaving the MFE in its normal non-hibernated state (e.g., more expensive than letting the MFE run on the client). For example, suppose a small MFE that just shows static text is determined to be hibernated since the MFE is outside the viewport. In this example, hibernating the small MFE may be more expensive and, in some cases, much more expensive than leaving the MFE alone (e.g., leaving the MFE in its normal state). In some such embodiments, for a particular MFE determined to be hibernated, activity listener 618 can determine the size of the MFE (e.g., the package script size of the MFE) and, based on the size of the MFE further determine whether the MFE is to be hibernated. If the size of the MFE is smaller than a predetermined threshold size (e.g., smaller than N Kb), activity listener 618 can determine that the MFE is not to be hibernated. The threshold size (i.e., the value of N) may be a configurable parameter and specified as part of the hibernation policy.

In some embodiments, activity listener 618 can listen for events on the MFEs to determine the number of events generated by the individual MFEs. For the MFEs that are not being interacted with and/or the MFEs that are to be hibernated, activity listener 618 can apply heuristics to the events that the individual MFEs are generating to intelligently approximate the resource usage (e.g., CPU cycles, power, and RAM) by the individual MFEs. Activity listener 618 can then prioritize the MFEs for hibernation based on their approximated resource usage. For example, suppose that the approximated resource usage by a first MFE that is to be hibernated is higher than the approximated resource usage by a second MFE that is to be hibernated. In this example, activity listener 618 can assign the first MFE a higher priority (e.g., a higher hibernation priority) than the second MFE.

Upon determining one or more MFEs on the page that are to be hibernated, activity listener 618 can orchestrate hibernation of the MFEs utilizing the services and functionality of image renderer 620, DOM packager 622, and DOM swapper 624. In some embodiments, for a particular MFE that is to be hibernated, activity listener 618 can utilize image renderer 620 to generate a screenshot image of the MFE, utilize DOM packager 622 to generate a manifest of the MFE, and utilize DOM swapper 624 to replace the MFE in the DOM with the screenshot image of the MFE.

Image renderer 620 can capture (e.g., generate) a screenshot image of an MFE that is to be hibernated. In some embodiments, the screenshot image of an MFE may be a low or medium resolution image of the MFE.

In some embodiments, prior to capturing a screenshot image of an MFE, image renderer 620 can determine whether an existing screenshot image of the MFE can be used. The existing screenshot image may be an image of the MFE from a previous hibernation of the MFE. For example, when generating a screenshot image of an MFE, image render 620 can also compute a checksum of the MFE (e.g., checksum on the root nodes of the DOM containers of the MFE) and save the computed checksum with the screenshot image of the MFE. Image renderer 620 can use the checksum computed for the MFE to determine whether the MFE has changed since the previous screenshot image of the MFE was taken. For example, image renderer 620 can compute a checksum of the MFE that is to be hibernated and determine whether the computed checksum is the same as a checksum computed at the time of capturing the existing screenshot image of the MFE (e.g., a checksum computed with the previous hibernation of the MFE). If the checksums are the same, image renderer 620 can conclude that the MFE has not changed since the previous hibernation of the MFE and use the existing screenshot image of the MFE. If the checksums are not the same, image renderer 620 can conclude that the MFE has changed since the previous hibernation of the MFE. In this case, image renderer 620 can capture a screenshot of the MFE and discard the existing screenshot of the MFE. Image renderer 620 can also save the screenshot of the MFE along with the computed checksum of the MFE to local storage, where they can subsequently be retrieved and used.

Still referring to browser 614, DOM packager 622 can generate a manifest of an MFE that is to be hibernated. The generated manifest includes the code representing the MFE. For example, DOM packager 622 can retrieve the code representing the MFE (e.g., the JavaScript and/or HTML of the MFE) from the DOM structure of the page. The manifest of the MFE also includes the MFE state information, such as the local variables, attribute values, and other data that the MFE was using at the time of hibernation. DOM packager 622 can save the generated manifest of the MFE to local storage, where it can subsequently be retrieved and used. For example, the manifest associated with an MFE can be retrieved and used to recreate the MFE in the same state as when the MFE was hibernated.

In some embodiments, DOM packager 622 can also determine whether dependencies of an MFE that is to be hibernated can also be hibernated. A dependency of an MFE that is to be hibernated can also be hibernated if no other MFE or section on the page depends on (e.g., uses) the dependency. For example, to hibernate a dependency, DOM packager 622 can remove the code representing the dependency from the DOM structure of the page. DOM packager 622 can save the code removed from the DOM in the manifest associated with the MFE, where it can subsequently be retrieved and used. For example, the code representing the dependency can be retrieved and used to recreate the MFE when the MFE exits from hibernation.

DOM swapper 624 can replace an MFE that is to be hibernated on the page with a screenshot image of the MFE. For example, DOM swapper 624 can remove the MFE (e.g., the code, e.g., JavaScript and/or HTML, representing the MFE) from the DOM structure of the page and replace the MFE with a screenshot image of the MFE. The screenshot image of the MFE can be the screenshot image generated by image renderer 620.

Referring again to activity listener 618, in some embodiments, activity listener 618 can listen for events on the MFEs to determine interaction with a hibernated MFE. That is, activity listener 618 can listen for interaction with an MFE in a hibernated state to exit the MFE from the hibernated state and back to its normal non-hibernated state. For example, the user can click/tap on, hover over, or otherwise select the displayed screenshot image of a hibernated MFE to move the hibernated MFE out of the hibernated state and back to its normal non-hibernated state. In response to determining interaction with a hibernated MFE, activity listener 618 can "reverse" the hibernation process to recreate the MFE on the page. In particular, according to one embodiment, activity listener 618 can recreate the MFE by retrieving the code representing the MFE from the manifest of the MFE and loading the code in the DOM structure of the page (e.g., replace the screenshot image of the MFE in the DOM with the code representing the MFE). Activity listener 618 can also restore the MFE to the same state at the time of hibernation using the state information from the manifest. In embodiments where dependencies of the MFE are also hibernated, activity listener 618 can retrieve the code representing the dependencies from the manifest and load the code in the DOM structure of the page as before (e.g., as before the code representing the dependencies were removed from the DOM structure). Once the MFE exits the hibernated state, the MFE operates as if it was never hibernated. For example, the user can interact with the MFE just as before without realizing that the MFE was de-hibernated.

Figure 8:
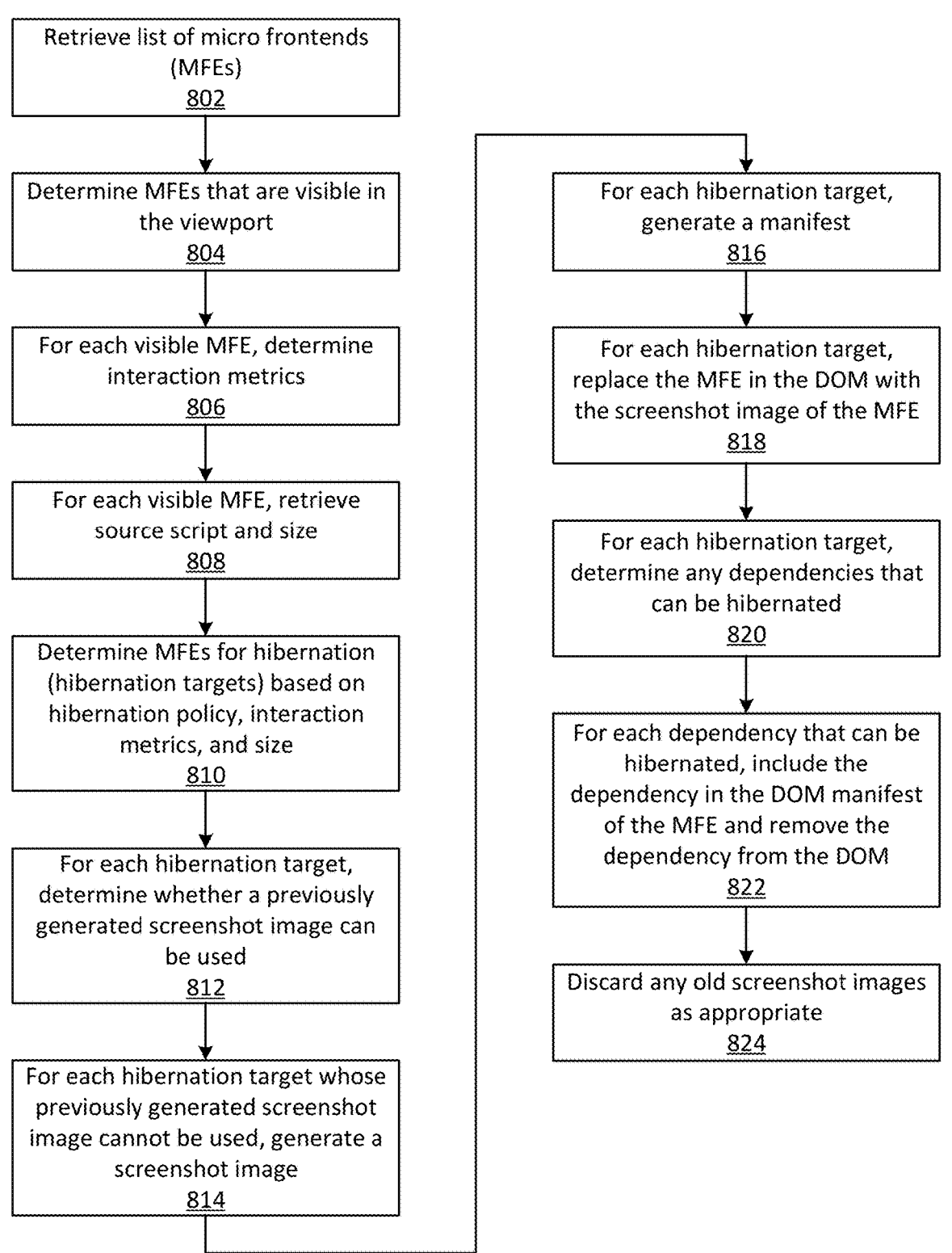
FIG. 8 is a flow diagram of an example process for intelligently hibernating micro frontends (MFEs), in accordance with an embodiment of the present disclosure.

FIG. 8 is a flow diagram of an example process 800 for intelligently hibernating micro frontends (MFEs), in accordance with an embodiment of the present disclosure. Illustrative process 800 may be implemented, for example, within a client (e.g., client 600 of FIG. 6) and, more particularly, within a browser thereof (e.g., browser 614 of FIG. 6). In more detail, process 800 may be performed, for example, in whole or in part by activity listener 618, image renderer 620, DOM packager 622, and DOM swapper 624, or any combination of these including other components of client 600 described with respect to FIG. 6. For purposes of this discussion, it is assumed that browser 614 on client 600 of FIG. 6 is displaying a page of a web application hosted by a web server.

With reference to process 800 of FIG. 8, at 802, a list of micro frontends (MFEs) on the page may be retrieved. For example, the MFEs that are on the page can be determined from the custom elements that define the MFEs within the DOM structure of the page.

At 804, the MFEs that are visible in the viewport may be determined. For example, the MFEs that are visible in the viewport can be determined by listening for events on the MFEs.

At 806, for each visible MFE, interaction metrics of the MFE may be determined. The interaction metrics of an MFE may indicate the extent to which the MFE is being interacted with. For example, interaction metrics of an MFE can be determined by listening form click or touch events on the MFE.

At 808, for each visible MFE, the code (e.g., source script) and the size of the MFE may be retrieved. For example, the code of an MFE (e.g., the JavaScript and/or HTML of the MFE) may be retrieved form the DOM structure of the page. The size of the MFE can correspond to the size of the code (e.g., correspond to the package script size of the MFE).

At 810, the MFEs for hibernation (i.e., the hibernation targets) may be determined based on a hibernation policy, the interaction metrics, and the size of the MFE. For example, the hibernation policy may be provided with the page of the web application by the web server. The hibernation policy can be used to determine the MFEs that can be hibernated and the conditions under which the MFEs can be hibernated. Based on the hibernation policy, the interaction metrics of the MFEs, and/or the sizes of the MFEs, a determination can be made as to which of the MFEs can be hibernated (e.g., determine the MFEs that are hibernation targets).

At 812, for each hibernation target, a check may be performed to determine whether an existing screenshot image (e.g., a previously generated screenshot image) of the MFE can be used. An existing screenshot image of an MFE that is to be hibernated can be used of the MFE has not changed since the time the existing screenshot image of the MFE was captured (e.g., generated). For example, a checksum computed for the MFE can be used to determine whether the MFE has changed since the existing screenshot image of the MFE was captured. At 814, for each hibernation target whose previously generated screenshot image cannot be used, a screenshot image of the MFE may be generated.

At 816, for each hibernation target, a manifest of the hibernation target (i.e., a manifest of the MFE that is to be hibernated) may be generated. The manifest associated with an MFE that is to be hibernated includes the code representing the MFE as well as the MFE state information at the time of hibernation.

At 818, for each hibernation target, the MFE in the DOM structure of the page may be replaced with the screenshot image of the MFE. For example, the code (e.g., the JavaScript and/or HTML) representing an MFE that is to be hibernated can be removed from the DOM structure of the page and replaced with the screenshot image of the MFE in the DOM. As a result, the MFE is hibernated and the screenshot image of the MFE is displayed on the page in place of the "live" MFE.

At 820, for each hibernation target, a check may be performed to determine whether any dependencies of the hibernation target (i.e., any dependencies of the MFE that is to be hibernated) can also be hibernated. A dependency of an MFE that is to be hibernated can also be hibernated if the dependency is not utilized by another MFE or section on the page (e.g., the dependency of the MFE is not relied upon by another MFE or section on the page).

At 822, for each dependency of a hibernation target that can be hibernated, the dependency may be included in the manifest generated for the hibernation target and the dependency may be removed from the DOM structure of the page.

At 824, any old screenshot images of MFEs may be discarded as appropriate. For example, previously generated screenshot images of MFEs which cannot be used since the MFEs have changed since the previously generated screenshot images were captured can be discarded.

Figure 9:
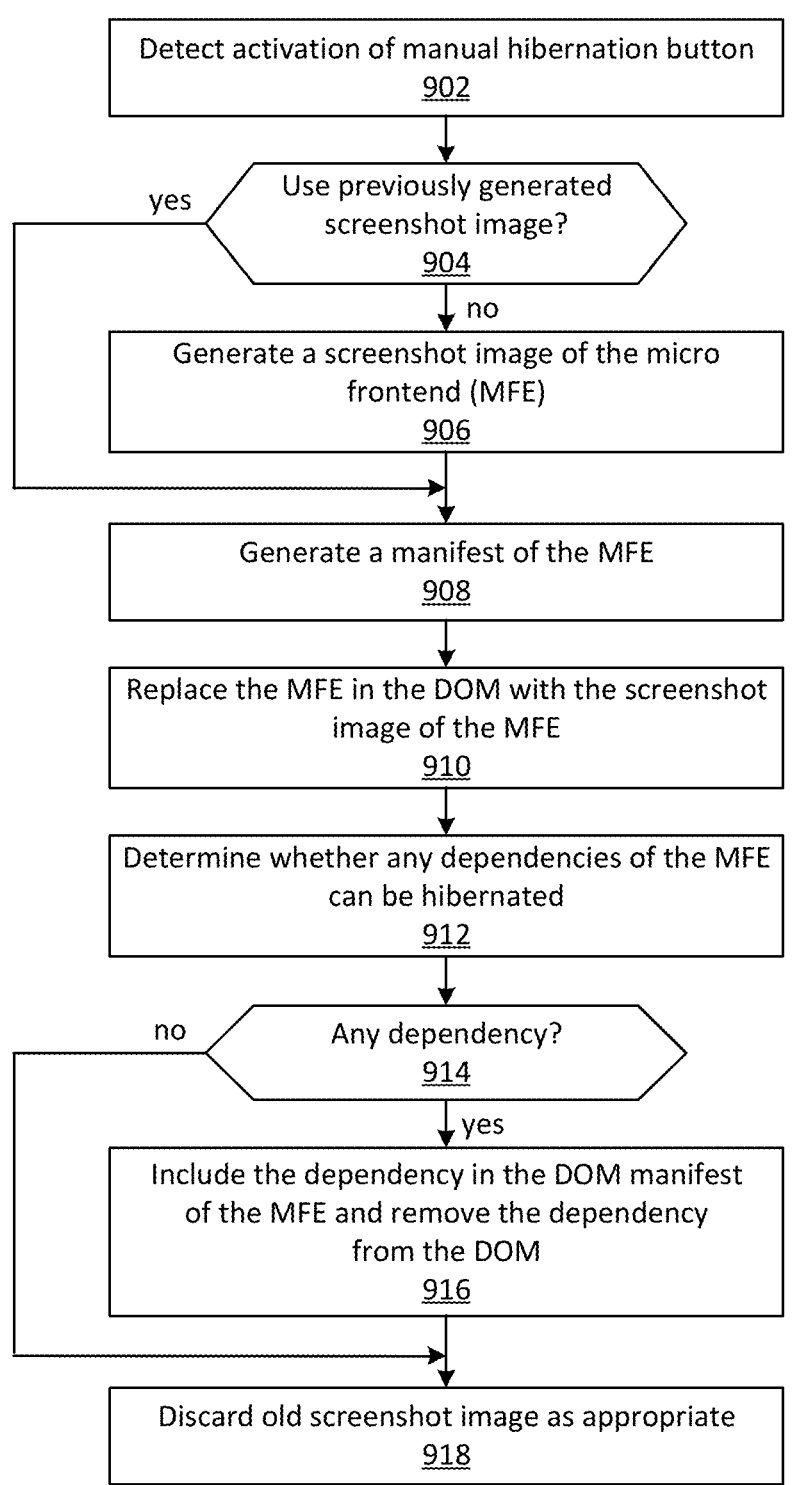
FIG. 9 is a flow diagram of an example process for hibernating a micro frontend (MFE) in response to an input, in accordance with an embodiment of the present disclosure.

FIG. 9 is a flow diagram of an example process 900 for hibernating a micro frontend (MFE) in response to an input, in accordance with an embodiment of the present disclosure. Illustrative process 900 may be implemented, for example, within a client (e.g., client 600 of FIG. 6) and, more particularly, within a browser thereof (e.g., browser 614 of FIG. 6). In more detail, process 900 may be performed, for example, in whole or in part by activity listener 618, image renderer 620, DOM packager 622, and DOM swapper 624, or any combination of these including other components of client 600 described with respect to FIG. 6. For purposes of this discussion, it is assumed that browser 614 on client 600 of FIG. 6 is displaying a page of a web application that includes an MFE that includes a manual hibernation button (e.g., an MFE that includes manual hibernation UI element 502 of FIG. 5).

With reference to process 900 of FIG. 9, at 902, activation of the manual hibernation button provided with the MFE may be detected. At 904, a check may be performed to determine whether an existing screenshot image (e.g., a previously generated screenshot image) of the MFE can be used.

If, at 904, it is determined that the existing screenshot image of the MFE cannot be used (e.g., the MFE has changed since the time the existing screenshot image of the MFE was captured or a screenshot image of the MFE does not exist), then, at 906, a screenshot image of the MFE may be captured (e.g., generated).

Otherwise, if, at 904, it is determined that it is determined that the existing screenshot image of the MFE can be used or upon generating a screenshot image of the MFE at 906, then, at 908, a manifest of the MFE may be generated.

At 910, the MFE in the DOM structure of the page may be replaced with the screenshot image of the MFE. As a result, the MFE is hibernated and the screenshot image of the MFE is displayed on the page in place of the "live" MFE.

At 912, a check may be performed to determine whether any dependencies of the MFE can also be hibernated. If, at 914, it is determined that dependencies of the MFE can also be hibernated, then, at 916, the dependencies may be included in the manifest generated for the MFE and the dependencies may be removed from the DOM structure of the page.

Otherwise, if, at 914, it is determined that there are no dependencies of the MFE that can be hibernated or upon hibernating the dependencies at 916, then, at 918, any old screenshot image of MFE may be discarded as appropriate. For example, an existing screenshot image of the MFE can be discarded if a new screenshot image of the MFE was taken at 906.

In the foregoing detailed description, various features of embodiments are grouped together for the purpose of streamlining the disclosure. This method of disclosure is not to be interpreted as reflecting an intention that the claims require more features than are expressly recited. Rather, inventive aspects may lie in less than all features of each disclosed embodiment.

As will be further appreciated in light of this disclosure, with respect to the processes and methods disclosed herein, the functions performed in the processes and methods may be implemented in differing order. Additionally or alternatively, two or more operations may be performed at the same time or otherwise in an overlapping contemporaneous fashion. Furthermore, the outlined actions and operations are only provided as examples, and some of the actions and operations may be optional, combined into fewer actions and operations, or expanded into additional actions and operations without detracting from the essence of the disclosed embodiments.

Elements of different embodiments described herein may be combined to form other embodiments not specifically set forth above. Other embodiments not specifically described herein are also within the scope of the following claims.

Reference herein to "one embodiment" or "an embodiment" means that a particular feature, structure, or characteristic described in connection with the embodiment can be included in at least one embodiment of the claimed subject matter. The appearances of the phrase "in one embodiment" in various places in the specification are not necessarily all referring to the same embodiment, nor are separate or alternative embodiments necessarily mutually exclusive of other embodiments. The same applies to the term "implementation."

As used in this application, the words "exemplary" and "illustrative" are used herein to mean serving as an example, instance, or illustration. Any aspect or design described herein as "exemplary" or "illustrative" is not necessarily to be construed as preferred or advantageous over other aspects or designs. Rather, use of the words "exemplary" and "illustrative" is intended to present concepts in a concrete fashion.

In the description of the various embodiments, reference is made to the accompanying drawings identified above and which form a part hereof, and in which is shown by way of illustration various embodiments in which aspects of the concepts described herein may be practiced. It is to be understood that other embodiments may be utilized, and structural and functional modifications may be made without departing from the scope of the concepts described herein. It should thus be understood that various aspects of the concepts described herein may be implemented in embodiments other than those specifically described herein. It should also be appreciated that the concepts described herein are capable of being practiced or being carried out in ways which are different than those specifically described herein.

Terms used in the present disclosure and in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an"

limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, such recitation should be interpreted to mean at least the recited number (e.g., the bare recitation of "two widgets," without other modifiers, means at least two widgets, or two or more widgets). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc.

All examples and conditional language recited in the present disclosure are intended for pedagogical examples to aid the reader in understanding the present disclosure, and are to be construed as being without limitation to such specifically recited examples and conditions. Although illustrative embodiments of the present disclosure have been described in detail, various changes, substitutions, and alterations could be made hereto without departing from the scope of the present disclosure. Accordingly, it is intended that the scope of the present disclosure be limited not by this detailed description, but rather by the claims appended hereto.

What is claimed is:

1. A method comprising:
monitoring, by a computing device, interaction metrics of one or more micro frontends (MFE) on a page of an application according to a hibernation policy, each of the one or more MFEs comprising autonomous components of the application;
determining, by the computing device, the MFE as a hibernation target;
responsive to the determination of the MFE as the hibernation target:
generating, by the computing device, a manifest associated with the MFE, the manifest including (i) code representing the MFE retrieved from a document object model (DOM) of the page and (ii) information about a current state of the MFE, wherein the code includes one or more of executable script and page markup;
storing, by the computing device, the manifest in local storage; and
replacing, by the computing device, the MFE on the page of the application with a screenshot image of the MFE to hibernate the MFE.

2. The method of claim 1, wherein the hibernation policy specifies one or more MFEs which can be hibernated and, for each MFE of the one or more MFEs, one or more conditions for hibernation.

3. The method of claim 2, wherein the one or more conditions include an MFE non-interaction duration threshold.

4. The method of claim 1, wherein the MFE is determined based on a size of the MFE.

5. The method of claim 1, wherein the information about the current state of the MFE in the manifest includes information about a dependency of the MFE.

6. The method of claim 1, wherein the screenshot image of the MFE is a screenshot of the MFE from a previous hibernation of the MFE.

7. The method of claim 1, wherein the MFE includes a manual hibernation user interface (UI) element.

8. The method of claim 1, further comprising, responsive to activation of the hibernated MFE, by the computing device:

recreating the MFE from the information about the current state of the MFE in the manifest;

saving the screenshot image of the MFE on the page to local storage; and replacing the screenshot image of the MFE on the page of the application with the recreated MFE.

9. A device comprising:

one or more non-transitory machine-readable mediums configured to store instructions; and one or more processors configured to execute the instructions stored on the one or more non-transitory machine-readable mediums, wherein execution of the instructions causes the one or more processors to carry out a process comprising:

determining a micro frontend (MFE) on a page of an application to hibernate based on interaction metrics of the MFE and a hibernation policy, wherein the MFE comprises an autonomous component of the application;

generating a manifest associated with the MFE, the manifest including (i) code representing the MFF retrieved from a document object model (DOM) of the page and (ii) information about a current state of the MFE, wherein the code includes one or more of executable script and page markup;

storing, by the computing device, the manifest in local storage; and replacing the MFE on the page of the application with a screenshot image of the MFE to hibernate the MFE.

10. The device of claim 9, wherein the hibernation policy specifies one or more MFEs which can be hibernated and, for each MFE of the one or more MFEs, one or more conditions for hibernation.

11. The device of claim 10, wherein the one or more conditions include an MFE non-interaction duration threshold.

12. The device of claim 9, wherein the MFE is determined based on a size of the MFE.

13. The device of claim 9, wherein the information about the current state of the MFE in the manifest includes information about a dependency of the MFE.

14. The device of claim 9, wherein the screenshot image of the MFE is a screenshot of the MFE from a previous hibernation of the MFE.

15. The device of claim 9, wherein the MFE includes a manual hibernation user interface (UI) element.

16. The device of claim 9, wherein the process further comprises:

responsive to activation of the hibernated MFE:

recreating the MFE from the information about the current state of the MFE in the manifest;

saving the screenshot image of the MFE on the page to local storage; and replacing the screenshot image of the MFE on the page of the application with the recreated MFE.

17. A method comprising:

injecting, by a computing device, a manual hibernation user interface (UI) element in a micro frontend (MFE) visible in a viewport of a page of an application, wherein the MFE comprises an autonomous component of the application; and responsive to activation of the manual hibernation UI element, forcing hibernation of the MFE by:

capturing, by the computing device, a screenshot image of the MFE;

generating, by the computing device, a manifest associated with the MFE, the manifest including (i) code representing the MFE retrieved from a document object model (DOM) of the page and (ii) information about a current state of the MFE, wherein the code includes one or more of executable script and page markup;

storing, by the computing device, the manifest in local storage; and replacing, by the computing device, the MFE on the page of the application with the screenshot image of the MFE to hibernate the MFE.

18. The method of claim 17, wherein the MFE is specified in a hibernation policy as an MFE that can be manually hibernated.

19. The method of claim 17, wherein the information about the current state of the MFE in the manifest includes information about a dependency of the MFE.

20. The method of claim 17, further comprising, responsive to activation of the hibernated MFE, by the computing device:

recreating the MFE from the information about the current state of the MFE in the manifest;

saving the screenshot image of the MFE on the page to local storage; and replacing the screenshot image of the MFE on the page of the application with the recreated MFE.

* * * * *